United States Patent [19]

Kazumi

[11] Patent Number: 5,206,678
[45] Date of Patent: Apr. 27, 1993

[54] CAMERA HAVING PRELIMINARY FLASH DEVICE FOR PREVENTING RED-EYE

[75] Inventor: Jiro Kazumi, Kanagawa, Japan

[73] Assignee: Canon Kabushiki Kaisha, Tokyo, Japan

[21] Appl. No.: 778,345

[22] Filed: Oct. 16, 1991

[30] Foreign Application Priority Data

Oct. 25, 1990 [JP] Japan ................................ 2-288130
Oct. 25, 1990 [JP] Japan ................................ 2-288133

[51] Int. Cl.⁵ .......................................... G03B 15/05
[52] U.S. Cl. ................................ 354/415; 354/413; 354/127.11
[58] Field of Search ........... 354/415, 137, 413, 127.11, 354/127.12

[56] References Cited

U.S. PATENT DOCUMENTS

| | | | |
|---|---|---|---|
| 4,299,464 | 11/1981 | Cushman | 354/135 |
| 4,499,663 | 3/1991 | Nakamura | 354/415 |
| 4,978,989 | 12/1990 | Nakano et al. | 354/413 |
| 5,070,355 | 12/1991 | Inoue et al. | 354/413 |
| 5,097,284 | 3/1992 | Taniguchi et al. | 354/415 |

*Primary Examiner*—Russell E. Adams
*Attorney, Agent, or Firm*—Robin, Blecker, Daley & Driscoll

[57] ABSTRACT

A camera of the kind performing a preliminary flashing action before flash photographing for the purpose of preventing the red-eye phenomenon is arranged to give indications to enable the photographer to know selection of a preliminary flashing mode when this mode is selected and execution of the preliminary flashing action when the preliminary flashing action becomes feasible.

24 Claims, 4 Drawing Sheets

CAMERA HAVING PRELIMINARY FLASH DEVICE FOR PREVENTING RED-EYE

BACKGROUND OF THE INVENTION

1. Field of the Invention

This invention relates to a camera system having a preliminary flash device for preventing a red-eye phenomenon prior to a shutter release in addition to a flashing means provided for flash photography.

2. Description of the Related Art

The camera of the kind having a flashing means for artificially emitting an illumination light to cover a shortage of light quantity in photographing has been well known and requires no exemplification here.

The flash photography which is to be carried out with the above-stated flashing means sometimes brings about a phenomenon called a red-eye phenomenon. This phenomenon causes the color of the pupil of a photographed person to become red in the photograph taken. To prevent the red-eye phenomenon, a red-eye preventing device has been proposed, for example, in Japanese Patent Publication No. SHO 58-48088. This device is arranged to cause the pupil of a person being photographed to be closed by the light of preliminary flashing made prior to shooting.

The above-stated red-eye preventing flashing must be arranged to continue at least one sec, for attaining a sufficient effect, because the reaction of the human eye is slow. Therefore, there has been proposed some camera that is arranged to inhibit a shutter release until the lapse of a given period of time required for the red-eye preventing preliminary flashing.

The conventional camera mentioned above is provided with a preliminary flashing means for preventing the red-eye phenomenon and is arranged to inhibit a shutter release for the given period of time, so that the red-eye phenomenon can be prevented for shooting. However, this camera has presented a problem in respect to operability, because: The arrangement to inhibit the shutter release not only irritates the photographer but also causes the photographer to feel misgivings that the camera might be out of order.

Another problem with the above-stated camera arranged to make preliminary flashing for preventing the red-eye phenomenon resides in that, in performing an action called "AE lock" for storing a light measurement value, the light measurement value might not be accurately stored if the AE lock is made during the process of the preliminary flashing.

SUMMARY OF THE INVENTION

One aspect or object of the invention under the present application lies in the provision of a camera which is of the kind performing a preliminary flashing action before flash photographing for the purpose of preventing the red-eye phenomenon and is arranged to give indications to enable the photographer to know selection of a preliminary flashing mode when this mode is selected and execution of preliminary flashing when the preliminary flashing action becomes feasible.

Another aspect of the invention lies in the provision of a camera which is arranged under the above-stated object to display the selection of the preliminary flashing mode by means of an external display device, when that mode is selected, and to display within a viewfinder that the preliminary flashing will be made when the camera becomes ready for the execution of preliminary flashing.

A further aspect of the invention lies in the provision of a camera of the above-stated kind which is arranged to perform accurate exposure control by inhibiting the exposure control from being performed according to a light measurement output obtained while the preliminary flashing is in process with the camera in an AF (automatic focusing) mode, an AE (automatic exposure) mode, etc.

A further aspect of the invention lies in the provision of a camera which is arranged under the above-stated object to make the preliminary flashing after a light measurement output is locked when the camera is in a one-shot AF mode and to make the preliminary flashing without locking the light measurement output when the camera is in any mode other than the one-shot AF mode.

A still further aspect of the invention lies in the provision of a camera which is arranged under the above-stated object to temporarily suspend the preliminary flashing when an AE lock operation is performed while the preliminary flashing is in process.

These and other aspects and features of the invention will become apparent from the following detailed description of an embodiment thereof taken in conjunction with the accompanying drawings.

DETAILED DESCRIPTION OF THE PREFERRED EMBODIMENTS

Figure 1:
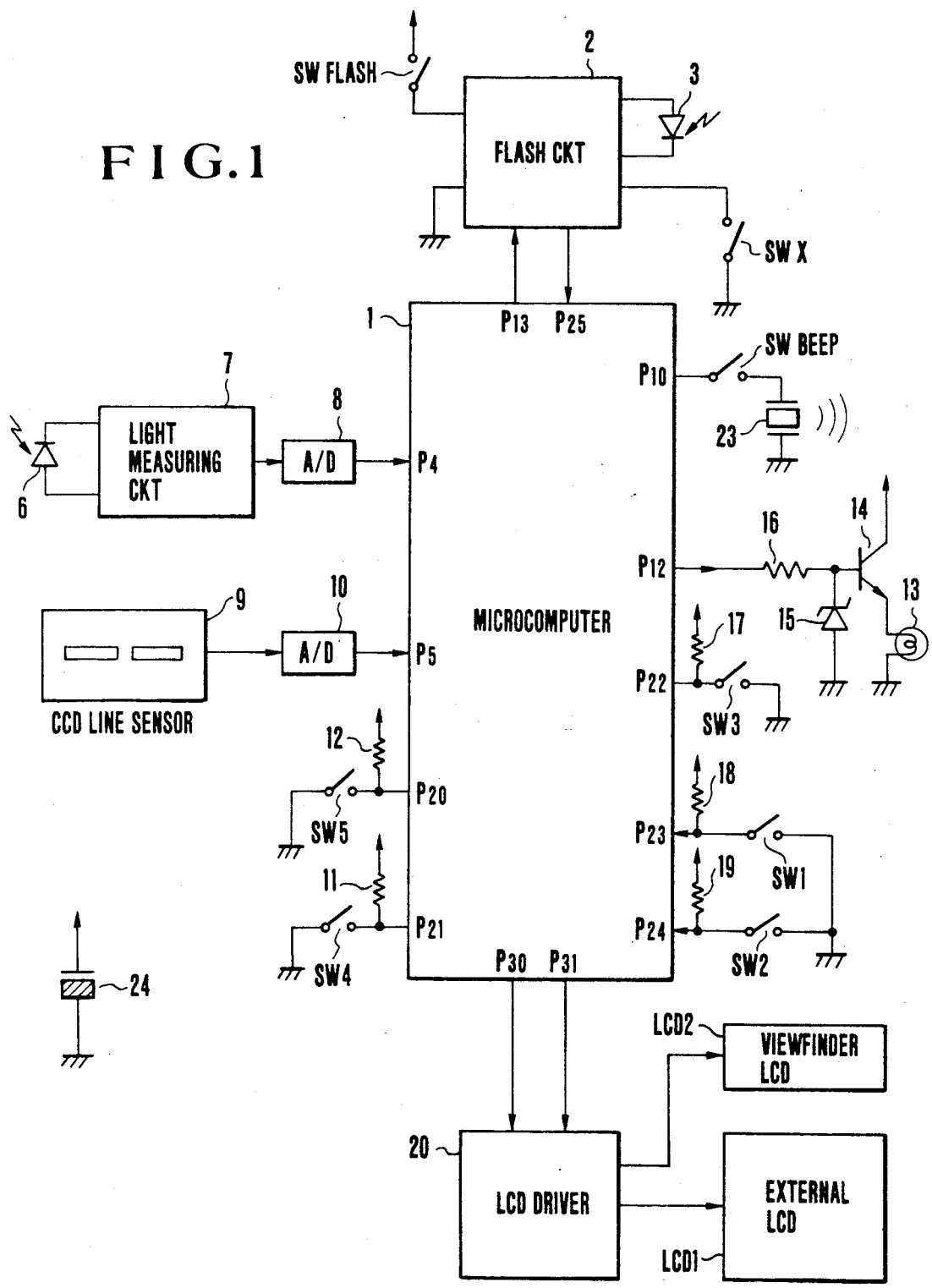
FIG. 1 is a block diagram showing an embodiment of this invention.

The following describes an embodiment of this invention with reference to the accompanying drawings:

FIG. 1 is a block diagram showing a camera which is arranged as the embodiment of this invention. A one-chip microcomputer 1 (hereinafter simply referred to as the microcomputer) has a ROM in which a program is written and a RAM which stores data. The ROM and the RAM are connected to a CPU which is arranged to perform arithmetic processing operations through an address buss and a data buss provided for inputs and outputs. The microcomputer 1 is arranged in a single chip to control the operations of the camera.

A flash circuit 2 is connected to an output port P13 and an input port P25 of the microcomputer 1 and is arranged to emit a flash light only when the output port P13 is at a high level. Further, the flash circuit 2 is arranged to output and supply a high level signal to the input port P25 upon completion of preparation for flashing when a capacitor for flashing is charged with electric energy required for flashing. A switch SW FLASH is provided for power supply to the flash circuit 2. A switch SW X is arranged to turn on when a shutter is fully opened and to allow a flash device to begin flashing when the switch SW X turns on. A light adjusting photodiode 3 is arranged to measure the flash light after it is reflected by the surface of the film. The flash light emission (flashing) is arranged to be brought to a stop when the measured flash light quantity reaches a given value.

A light measuring photodiode 6 is arranged to be capable of measuring the luminance of an object to be photographed. The output signal of the light measuring photodiode 6 is amplified by a light measuring circuit 7. The signal thus amplified is converted by an A/D (analog-to-digital) converter 8 into a digital value. The digital value data thus obtained is inputted to a port P4 of the microcomputer 1. A pair of CCD line sensors 9 for distance measurement is arranged to form an image corresponding to the moving amount (defocus amount) of a lens from its in-focus position. An image signal which is thus obtained by the CCD line sensor pair 9 is converted into a digital value by an A/D converter 10. The digital signal thus obtained is inputted to a port P5 of the microcomputer 1. The microcomputer 1 is arranged to perform an AF action by moving the lens (not shown) to an extent corresponding to the defocus amount indicated by the digital value data inputted.

The microcomputer 1 is provided with input ports P20, P21, P22, P23 and P24 which are connected to switches SW5, SW4, SW3, SW1 and SW2 respectively. These input ports are thus connected to a power supply through resistors 12, 11, 17, 18 and 19 for pull-up, respectively. The switches SW1 and SW2 are arranged to be operated by a shutter release button. The switch SW1 is arranged to be turned on by the first stroke of the shutter release button and the switch SW2 by the second stroke of the shutter release button. The switch SW3 is provided for selection of the red-eye preventing mode. The switch SW4 is for selection of the AF mode. The switch SW5 is an AE lock switch.

An LCD driver 20 is arranged to cause liquid crystal display devices LCD1 and LCD2 to make displays in response to signals sent from output ports P30 and P31 of the microcomputer 1. The output ports P30 and P31 of the microcomputer 1 has a serial communicating function. The output port P30 outputs a synchronizing clock signal while the output port P31 outputs data. The liquid crystal display device LCD1 is disposed in such a position where it is visible from outside of the camera. The liquid crystal display device LCD2 is disposed inside of the camera in such a position that the display made by the display device LCD2 is visible by peeping into the viewfinder of the camera.

A red-eye preventing lamp 13 (hereinafter referred to as a red-eye lamp) is disposed and arranged within the reflection shade of the flash device in such a way as to illuminate the object to be photographed. A constant voltage circuit which consists of a transistor 14, a Zener diode 15 and a resistor 16 is arranged to be driven to light up the red-eye preventing lamp 13 when the output port P12 of the microcomputer 1 is at a high level. A piezoelectric buzzer 23 is arranged to emit sound in response to a signal applied thereto. The buzzer 23 is connected via a switch SW BEEP to the output port P10 of the microcomputer 1. A battery 24 is connected to the power supplies of all the circuits of the camera.

Figure 2A:
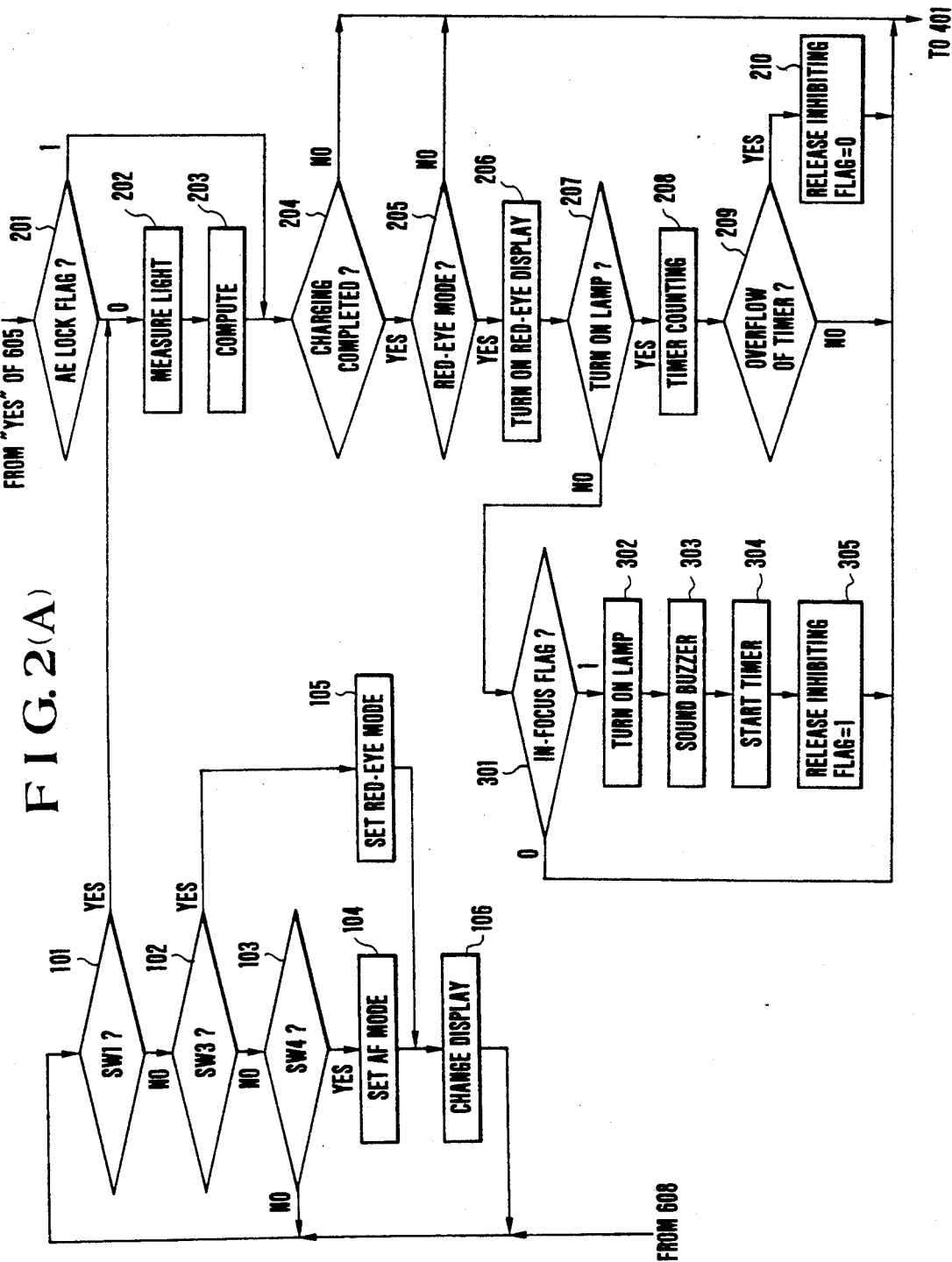
FIGS. 2(A) and 2(B) are flow charts showing the operation of the embodiment.
Figure 2B:
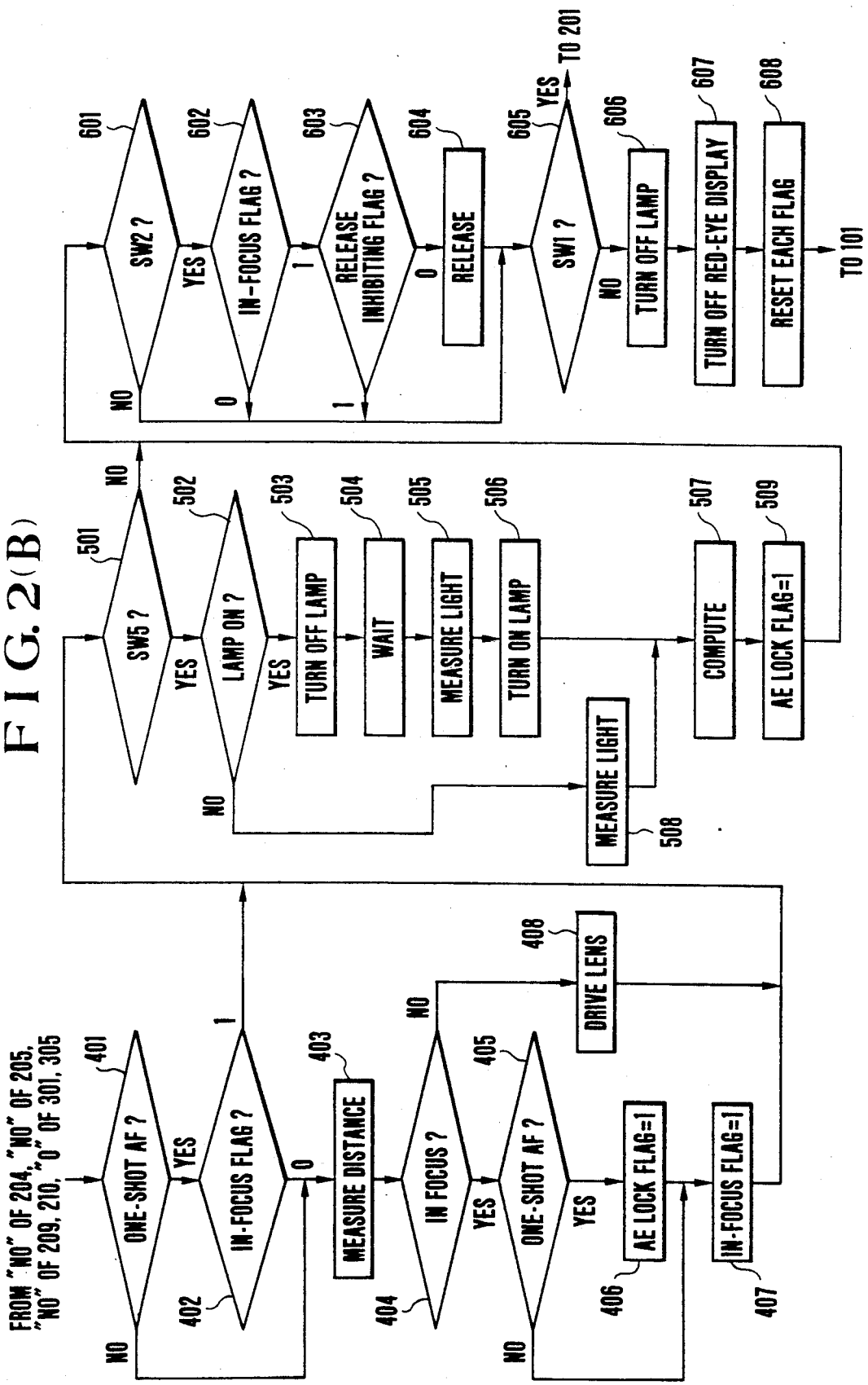

The operation of the embodiment arranged as described above is described below with reference to FIGS. 2(A) and 2(B) which are flow charts:

Step 101: A check is made for the state of the switch SW1. The switch SW1 can be judged to be not pushed if the input port P23 is at a high level and to be pushed if the input port P23 is at a low level. (The manner in which the states of other switches are checked is similar to the check made for the switch SW1 and is therefore omitted from the following description). If the switch SW1 is pushed, the camera is considered to be in a shooting condition. The flow of operation then comes to execute a next step 202 and steps ensuing thereon. If the switch SW1 is not pushed, the flow comes to the step 102 and a step 103 to make checks for the states of switches SW3 and SW4. If the switch SW3 which is provided for selecting the red-eye preventing mode, a flag which is provided on the RAM for the red-eye preventing mode is inverted. More specifically, the camera is set in the red-eye preventing mode in which the red-eye lamp 13 is allowed to flash, if the camera is in a mode of not allowing the red-eye lamp 13 to flash, and is set in the mode of not allowing the red-eye lamp 13 to flash if the camera is in the red-eye preventing mode (a step 105). After the mode is altered in this manner, the flow comes to a step 106 to perform serial communication with the LCD driver 20 for a display corresponding to the new mode.

In a case where the AF mode selection switch SW4 is pushed, the flow comes to a step 104 to likewise make change-over between a one-shot mode in which AF (automatic focusing) is not performed until the switch SW1 is turned off after an in-focus state is once attained and a servo mode in which the AF action is constantly performed. After this mode change-over, the flow comes to a step 106 to make a display corresponding to the applicable mode.

Figure 3A:
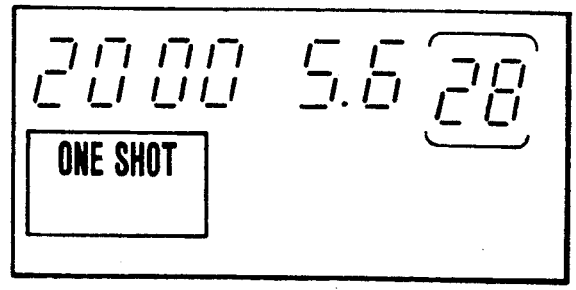
FIGS. 3(A), 3(B), 3(C), 4(A), 4(B) and 5 are plan views showing by way of example different displays made by a display device.
Figure 3B:
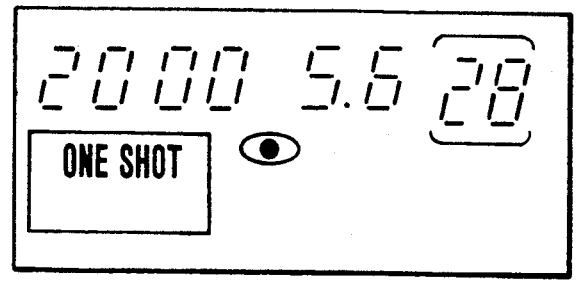
Figure 3C:
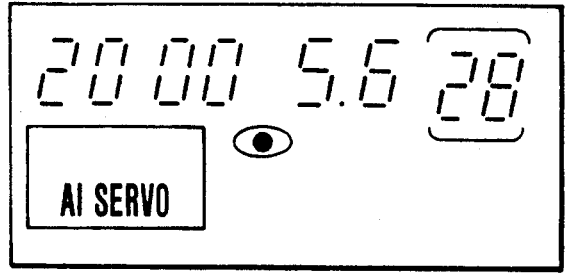

FIGS. 3(A), 3(B) and 3(C) show examples of the above-stated displays. These displays are made by the external liquid crystal display device LCD1. The display shown in FIG. 3(A) is made to show the one-shot AF mode with the camera not in the red-eye preventing mode. The display shown in FIG. 3(B) is made to show the one-shot AF mode with the camera in the red-eye preventing mode. The display shown in FIG. 3(C) is made to show the servo AF mode with the camera in the red-eye preventing mode. In each of these displays, the numerical values appearing in the upper part of the display denote a shutter speed, an aperture value and the value of a film frame counter. If the switch SW1 is found to be pushed at the step 101, the flow comes to the step 202. At the step 202: The luminance of the object is first obtained by reading the value of the port P4 (where an A/D converted value of the output of the photodiode 6 is inputted). The flow then comes to a step 203. At the step 203: Arithmetic operations are carried out to obtain shutter speed and aperture control values on the basis of the luminance of the object.

Figure 4A:
Figure 4B:
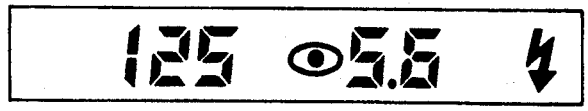

At a step 204: A check is made for the level of the port P25. If the port P25 is found to be at a low level, it indicates that an electric charging process for flashing by the flash device has not been completed. In that case, therefore, the flow comes to a step 401 for an AF process without doing any process for the red-eye lamp 13 at a step 206 and steps ensuing on the step 206. In a case where the red-eye preventing mode is judged at the step 205 to be not set, the flow also comes to the step 401 for the AF process. If the electric charging process on a main capacitor for flashing the flash device is completed, with the camera having been set in the red-eye preventing mode, the flow comes to the step 206. At the step 206: The red-eye preventing mode is displayed by the liquid crystal display device LCD2. FIG. 4(A) shows by way of example a display made without showing the red-eye preventing mode. FIG. 4(B) shows by way of example a display made showing the red-eye preventing mode. In each of these displays, the numerical values in the upper part of the display indicate a shutter speed and an aperture value like in the displays shown in FIGS. 3(A) to 3(C). In this instance, the flow comes to a step 207 to make a check for the state of the red-eye lamp 13. If the red-eye lamp 13 is found to be on, the flow comes to a step 208 to allow a timer to count time. The flow comes to a step 209. At the step 209: A check is made for the counted value of the timer. If the time-counted value is at least one sec, the flow comes to a step 210 to cancel a release inhibiting flag set at the RAM. The timer time is set to be longer than the period of time required before the pupil of a person to be photographed is made to be small by the red-eye lamp 13. If the red-eye lamp 13 is found not yet to be lighted up at the step 207, the flow comes to a step 301 to execute a lamp lighting process by the steps including the 301 and steps ensuing on the steps 301.

At the step 301: If the lens is not in focus, that is, if an in-focus flag which will be described later is not set up, the flow comes to a step 401 to execute an AF process by the step 401 and steps ensuing on the step 401. If the lens is found to be in focus, the flow comes to a step 302 to first light up the red-eye lamp 13 by making the level of the output port P12 high. Next, the flow comes to a step 303 to let the buzzer 23 emit sound. The sound is emitted by alternately making the level of the port P10 high and low at intervals of 0.1 msec. In this instance, if the switch SW BEEP is in its on-state, the sound is caused to be emitted by applying a square wave of 5 KHz to the piezoelectric buzzer 23. Next, the flow comes to a step 304 to let the timer which is mentioned in relation to the step 208 start counting. At the same time, the flow comes to a step 305 to set the release inhibiting flag on the RAM. With the release inhibiting flag thus set, the shutter release is inhibited until the effect of the red-eye lamp 13 is attained.

Next, the AF process is described as follows: At the step 401: A check is made for the one-shot AF mode. The flow comes to a step 402 if the one-shot AF mode is selected. At the step 402: If the in-focus flag (which is data set on the RAM when an in-focus state is attained) is set, the flow comes to a next process without executing the AF process. If not, the flow comes to a step 403. At the step 403: A process called a distance measuring action is executed to find the amount of defocus from image data obtained by the CCD line sensor pair 9. At a next step 404: A check is made to find if an infocus state is attained. If not, the flow comes to a step 408. At the step 408: The lens which is not shown is driven to perform the AF action according to the amount of defocus. If an in-focus state is found to have been attained at the step 404, the flow comes to a step 405. At the step 405: A check is made for the one-shot AF mode. If the camera is found to be in the one-shot AF mode, the flow comes to a step 406. At the step 406: An AE lock flag (data to be set on the RAM in the case of the AE lock) is set. At a step 407: The in-focus flag is set without recourse to the AF mode. Next, a process for the switch SW5 which is a AE lock button is executed. At a step 501: A check is made for the state of the switch SW5. If the switch SW5 has not been pushed, the flow comes to a next process. If the switch SW5 is found to be in a pushed state at the step 501, the flow comes to a step 502. At the step 502: A check is made for the state of the red-eye lamp 13. If the red-eye lamp 13 is not lighted up, the flow comes to a step 508 for light measurement. At a step 507: An arithmetic operation is executed on the result of the light measurement to obtain a shutter speed value and an aperture value. At a step 509: The AE lock flag is set up and the flow proceeds to the next process. If the red-eye lamp 13 is found to be lighted up at the step 502, the flow comes to a step 503. At the step 503: The red-eye lamp 13 is first put out by making the level of the output port P12 low. The flow then comes to a step 504 to wait for a while until the red-eye lamp 13 is completely put out. At a step 505: A light measurement process is executed. At a step 506: The red-eye lamp 13 is again lighted up. After that, the flow comes to the step 507 to execute an arithmethic operation in the same manner as when the red-eye lamp 13 is found to be not lighted up. The flow then comes to the step 509 to set up the AE lock flag as mentioned above.

Next, a process for the switches SW2 and SW1 of the shutter release button is described as follows: If the switch SW2 is found at a step 601 to be in an on-state with the shutter release button pushed down to its second stroke position; if the in-focus flag is found at a step 602 to be set up; and if the release inhibiting flag is found at a step 603 to be not set up, the flow comes to a step 604 to execute a release process for allowing a shutter release. In the release process, exposure control is carried out on the basis of the latest light measurement value or a light measurement value which is locked in the case of AE lock. In cases where the above-stated conditions for a shutter release are not satisfied and the switch SW1 is found, at a step 605, to be still in a state of being pushed, the flow comes to a step 201.

At the step 201: A check is made for the state of AE lock flag. If the AE lock flag is found to be not set up, the flow comes to a step 202 for light measurement. If the AE lock flag is found at the step 201 to be set up, the flow bypasses the process of light measurement and comes to a step 204 to make a check for completion of the charging process.

If the switch SW1 is found to have been released from the state of being pushed at the step 605, the flow comes to a step 606. At the step 606: The red-eye lamp 13 is put out and the flow comes to a step 607. At the step 607: The red-eye preventing mode display made by the display device LCD2 is put out and the flow comes to a step 608. At the step 608: The in-focus flag, the AE lock flag and the release inhibiting flag are canceled. The flow then comes back to the step 101 to set the red-eye preventing mode or the AF mode.

Figure 5:

In the case of the embodiment described, a liquid crystal display device is employed as the second display means LCD2. However, the second display means LCD2 may be replaced with any other display means as long as the display means permits confirmation through the viewfinder. For example, an LED lap or the like may be arranged to light up in place of the display made by the second display means LCD2. Further, it goes without saying that this display means may be used also for a display of some other information. More specifically, a g-segment of the fourth place among seven-segment units indicating a shutter time (speed) value, as shown in FIG. 5, may be arranged to blink for giving a warning against the red-eye phenomenon.

Further, a means for setting a countermeasure against the red-eye phenomenon does not have to be an independently operable manner. For example, an AE mode change-over means may be arranged to permit selection or nonselection of the countermeasure against the red-eye phenomenon. More specifically, with the camera provided with a selection means for changing a program AE mode over to a manual exposure mode and vice versa, if the countermeasure is arranged to be operative only in the program AE mode, such selection means is of course acceptable.

What is claimed is:

1. A camera arranged to perform, prior to flash photographing, a preliminary flashing action on an object so as to prevent a red-eye phenomenon, comprising:
   a) selection means for selecting a preliminary flashing mode of executing the preliminary flashing action;
   b) a detecting circuit arranged to detect a state of preparation for flash photography; and
   c) an indicating device for indicating selection of the preliminary flashing mode when the preliminary flashing mode is selected by said selection means, and for indicating execution of the preliminary flashing action when the preliminary flashing mode is selected by said selection means and completion of the preparation for flash photography is detected by said detecting circuit.

2. A camera according to claim 1, wherein said indicating device includes a first indicating body arranged to indicate the selection of the preliminary flashing mode and a second indicating body arranged to indicate the execution of the preliminary flashing action.

3. A camera according to claim 2, wherein said first indicating body includes an external display device of the camera.

4. A camera according to claim 3, wherein said second indicating body includes a display device arranged to make a display within a viewfinder of the camera.

5. A camera according to claim 2, wherein said second indicating body includes a display device arranged to make a display within a viewfinder of the camera.

6. A camera according to claim 1, wherein said detecting circuit is arranged to detect the state of preparation for flash photography by detecting a state of charging of a flash device.

7. A camera according to claim 1, wherein said indicating device is arranged to indicate selection of the preliminary flashing mode when the preliminary flashing mode is selected even if a shutter release operation member is not operated and to indicate execution of the preliminary flashing action when the shutter release member is operated.

8. A camera according to claim 7, wherein said indicating device includes a first indicating body arranged to indicate the selection of the preliminary flashing mode and a second indicating body arranged to indicate the execution of the preliminary flashing action.

9. A camera arranged to perform, prior to flash photographing, a preliminary flashing action on an object so as to prevent a red-eye phenomenon, comprising:
   a) selection means for selecting a preliminary flashing mode of executing the preliminary flashing action;
   b) a detecting circuit arranged to detect a state of preparation for flashing photography;
   c) an indicating device for indicating selection of the preliminary flashing mode when the preliminary flashing mode is selected by said selection means, and for indicating execution of the preliminary flashing action when the preliminary flashing mode is selected by said selection means and completion of the preparation for flash photography is detected by said detecting circuit; and
   d) a control circuit for causing the preliminary flashing action to be executed, said control circuit being arranged to operate after the execution of the preliminary flashing action is indicated by said indicating device.

10. A camera according to claim 9, further comprising an automatic focusing device, and wherein said control circuit is arranged to operate after completion of focus adjustment by said automatic focusing device.

11. A camera arranged to perform, prior to flash photographing, a preliminary flashing action on an object so as to prevent a red-eye phenomenon, comprising:
   a) a light measuring circuit arranged to form a light measurement value to be used for exposure control;
   b) a control circuit for causing the preliminary flashing action to be executed; and
   c) a processing circuit having a first mode in which an output of said light measuring circuit obtained while the preliminary flashing action is in process is process as the light measurement value to be used for exposure control and a second mode in which an output of said light measuring circuit obtained while the preliminary flashing action is not executed is processed as the light measurement value to be used for exposure control.

12. A camera according to claim 11, further comprising an automatic focusing device which has a one-shot mode in which a driving action of a lens is inhibited after an in-focus state is attained once, and wherein said processing circuit is arranged to operate in the second mode when said automatic focusing device performs a automatic focusing action in the one-shot mode.

13. A camera according to claim 11, further comprising an automatic focusing device which has a servo mode in which a lens is allowed to be driven when the lens comes to be in a defocus state after attainment of an in-focus state, and wherein said processing circuit is arranged to operate in the first mode when said automatic focusing device performs an automatic focusing action in the servo mode.

14. A camera according to claim 11, having an AE lock mode in which an output of said light measuring circuit is locked by an operation of an operation member as a light measurement value to be used for exposure control, and wherein said processing circuit is arranged to operate in the second mode when the camera is in the AE lock mode.

15. A camera according to claim 11, wherein said processing circuit is arranged to allow said light measuring circuit to perform a light measuring action even under the preliminary flashing action of the camera when said processing circuit is in the first mode and to inhibit the light measuring action of said light measuring circuit from being performed under the preliminary flashing action when said processing circuit is in the second mode.

16. A camera according to claim 15, further comprising an automatic focusing device which has a one-shot mode in which a driving action of a lens is inhibited after an in-focus state is attained once, and wherein said processing circuit is arranged to operate in the second mode when said automatic focusing device performs an automatic focusing action in the one-shot mode.

17. A camera according to claim 15, further comprising an automatic focusing device which has a servo mode in which a lens is allowed to be driven when the lens comes to be in a defocus state after attainment of an in-focus state, and wherein said processing circuit is arranged to operate in the first mode when said automatic focusing device performs an automatic focusing action in the servo mode.

18. A camera according to claim 15, having an AE lock mode in which an output of said light measuring circuit is locked by an operation of an operation member as a light measurement value to be used for exposure control, and wherein said processing circuit is arranged to operate in the second mode when the camera is in the AE lock mode.

19. A camera arranged to perform, prior to flash photographing, a preliminary flashing action on an object so as to prevent a red-eye phenomenon, comprising:
   a) a light measuring circuit;
   b) a first control circuit arranged to cause the preliminary flashing action to be executed;
   c) an automatic focusing device having a one-shot automatic focusing mode in which a driving action of a lens in inhibited after an in-focus state is attained once;
   d) a lock circuit for locking an output of the light measuring circuit when an automatic focusing action is performed in the one-shot automatic mode; and
   e) a second control circuit arranged to render said first control circuit operative after the output of said light measuring circuit is locked by said lock circuit.

20. A camera according to claim 19, wherein said automatic focusing device further has a second focusing mode different from the one-shot automatic focusing mode, said lock circuit and said second control circuit being arranged to become inoperative when said automatic focusing device is in the second focusing mode.

21. A camera according to claim 19, wherein said lock circuit is arranged to operate when an in-focus state is attained by said automatic focusing device.

22. A camera arranged to perform, prior to flash photographing, a preliminary flashing action on an object so as to prevent a red-eye phenomenon, comprising:
   a) a light measuring circuit;
   b) a lock circuit arranged to lock an output of said light measuring circuit in response to an operation of an operation member performed before a shutter release process is performed by an operation of a shutter release member; and
   c) an inhibition circuit arranged to inhibit the preliminary flashing action from being executed concurrently with a locking action of said lock circuit when said lock circuit is operating.

23. A camera according to claim 22, wherein said inhibition circuit is arranged to suspend the preliminary flashing action when the locking action is performed while the preliminary flashing action is in process.

24. A camera arranged to perform, prior to flash photographing, a preliminary flashing action on an object so as to prevent a red-eye phenomenon, comprising:
   a) a light measuring circuit;
   b) a flashing control circuit arranged to cause the preliminary flashing action to be executed;
   c) a lock circuit arranged to lock a light measurement output of said light measuring circuit obtained at a predetermined point of time before a shutter release; and
   d) a second control circuit arranged to suspend the preliminary flash action when a locking action of said lock circuit is performed on the light measurement output while the preliminary flashing action is in process.

* * * * *

UNITED STATES PATENT AND TRADEMARK OFFICE
CERTIFICATE OF CORRECTION

PATENT NO. : 5,206,678
DATED : April 27, 1993
INVENTOR(S) : Jiro Kazumi

It is certified that error appears in the above-identified patent and that said Letters Patent is hereby corrected as shown below:

Col. 6, line 11.  Change "not lighted up" to -- unlighted --

Col. 6, line 51.  Change "lap" to -- lamp --

Col. 8, line 17.  Change "process" to -- processed --

Col. 8, line 28.  Change "a" to -- an --

Signed and Sealed this

Twenty-fifth Day of January, 1994

Attest:

BRUCE LEHMAN

*Attesting Officer*  *Commissioner of Patents and Trademarks*